United States Patent [19]

Nakatani et al.

[11] Patent Number: 4,839,742

[45] Date of Patent: Jun. 13, 1989

[54] REFLECTED-CHARACTER PRINTING APPARATUS

[75] Inventors: Yukio Nakatani, Nagoya; Akihiro Ito, Chiryu; Takashi Sakai, Nagoya, all of Japan

[73] Assignee: Brother Kogyo Kabushiki Kaisha, Japan

[21] Appl. No.: 107,288

[22] Filed: Oct. 9, 1987

[30] Foreign Application Priority Data

Oct. 13, 1986 [JP] Japan ................................ 61-241270
Nov. 14, 1986 [JP] Japan ................................ 61-272136

[51] Int. Cl.$^4$ ........................ H04N 1/21; G01D 15/10

[52] U.S. Cl. ................................ 358/296; 346/76 PH; 400/323.1; 400/208

[58] Field of Search ................... 358/296; 346/76 PH; 400/323.1, 208

[56] References Cited

U.S. PATENT DOCUMENTS 4,480,936 11/1984 Kasun ................................ 400/208
4,568,951 2/1986 Hasegawa ...................... 346/76 PH
4,760,458 7/1988 Watanabe ........................... 358/296

*Primary Examiner*—E. A. Goldberg
*Assistant Examiner*—Mark Reinhart
*Attorney, Agent, or Firm*—Kane, Dalsimer, Sullivan, Kurucz, Levy, Eisele and Richard

[57] ABSTRACT

A printing apparatus comprising a keyboard which inputs characters, symbols, etc., to the apparatus and a display which displays the input characters, symbols, etc. A CPU supplies to a printing head dot pattern information in accordance with the information on the input character, symbols, etc., stored in a main memory. It also inverts the dot pattern information upside down, as needed. The printing head may print onto a lettering tape.

3 Claims, 8 Drawing Sheets

REFLECTED-CHARACTER PRINTING APPARATUS

TECHNICAL FIELD OF THE INVENTION

This invention relates to a printing apparatus which is capable of printing reflected characters on a sheet of transparent paper.

1. Background of the Invention

Letters printed on a document made by a word-processor or the like are sometimes desired to be printed as reflected characters on a transparent medium. For example, in applications, such as an instant lettering sheet or an overhead projector (OHP), in which characters are read in an inverted state, reflected characters are required to be printed on objects.

2. Prior Art

In a conventional printing apparatus of this type, reflected characters are formed and registered in advance by external character registration, and desired characters are accessed as needed to form desired characters. Even if these external characters may be sequenced, the character sequence is reverse, so that it makes no sense as a word or sentence. It is necessary that external characters are arranged to be input sequentially from the external character to be placed at the end of a word or a sentence to the character to be placed at the head position of the word or sentence There is a printing apparatus which is capable of selecting between the normal printing direction and the reverse printing direction, but it suffers from its mechanical complexity.

Reflected characters are useful for creating a lettering tape which is used, for example, to transfer titles or the like onto index cards for audio cassette tapes, labels on video cassettes, the spines of document files or the like.

There is no printing apparatus which can create a lettering tape of this type in a simple manner. There are commercially available prints, if any, including a transparent film sheet on which reflected characters are screen printed. The user can select desired characters among them and transfers them to an object by rubbing the back of the prints. These prints, however, contain not only desired characters, symbols etc., but also undesired ones. In addition, many of these prints must be bought wastefully to collect necessary characters, symbols, etc. Furthermore, when a word, a phrase or a simple sentence is to be formed using such characters, desired characters must be selected one by one and transferred to an object, so that it takes much time to compose a word, a phrase or the like and to adjust the positions of the characters. The resulting layout is, however, not so good, and therefore these prints are inconvenient to use.

There is a label producing machine which is not of the type which transfers characters, symbols, etc., to an object, but of the type which prints desired characters, symbols, etc., on a thick resin tape. However, a label created by this machine makes an ill appearance because it is thick and likely to be separated.

OBJECTS OF THE INVENTION

It is a first object of this invention to provide a printing apparatus which eliminates the drawbacks with the conventional printing apparatus, and is capable of printing appropriate reflected characters, symbols, etc., by simple operations It is a second object of this invention to provide a printing apparatus which is capable of printing a train of reflected characters, symbols, etc., formed by selection, edition or the like onto a lettering tape, the characters, symbols, etc., of which are transferrable easily onto an object.

SUMMARY OF THE INVENTION

A printing apparatus according to this invention comprises:

input means for inputting characters, symbols, etc., to the apparatus;

display means for displaying the input characters symbols etc.;

main memory means for storing input information on the characters, symbols, etc.;

means for supplying to a printing head dot pattern information in accordance with the information on characters, symbols, etc., stored in the main memory means; and the supplying means including means for inverting the dot pattern information upside down, as needed.

The printing head transfers reflected characters, symbols, etc. onto a transfer tape via an ink ribbon.

The printing apparatus according to this invention is capable of printing characters, symbols, etc., as they are, created by a regular document creating operation, so that it is unnecessary to form and register external characters in a complicated manner and to rearrange the thus formed and registered external characters in a reverse order. The apparatus can achieve its expected object by printing characters, symbols, etc., drawn up in a regular manner, under reflected character designation.

According to this invention, the printing apparatus provides a lettering tape with desired characters, symbols, words, phrases or simple sentences using microcomputer control, so that transfer of titles or the like to various index cards or labels is performed easily and efficiently.

DESCRIPTION OF PREFERRED EMBODIMENTS

This invention will now be described with reference to the accompanying drawings illustrating a preferred embodiment thereof.

Figure 1:
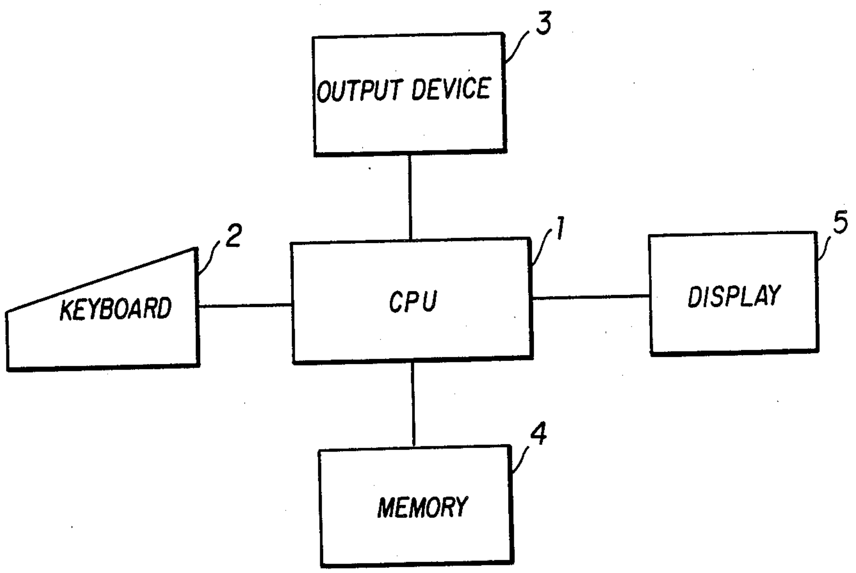
FIG. 1 is a block diagram showing the basic structure of a printing apparatus according to this invention.

FIG. 1 is a block diagram showing the basic structure of a printing apparatus according to this invention which includes a central processing unit (CPU) 1, a keyboard 2, an output device 3, a memory 4, and a display 5.

Characters, symbols, etc., input by the keyboard 2 are displayed on the display 5 under control of CPU 1 and stored in the memory 4 in accordance with a predetermined procedure. The contents stored temporarily in the memory 4 drive a printing head (not shown) of the output device 3 in accordance with printing instructions to print/display the stored contents which may be a train of alphanumeric characters, symbols, etc.

The memory 4 includes a main memory unit and a line buffer (not shown). The information stored in the text area of the main memory unit is transferred temporarily to the line buffer, and then supplied to the printing head as dot pattern information for printing purposes. The printing apparatus according to this invention has a function of printing the stored information in units of a line in an upside-down inverted form. Such inverted printing is performed by pure electrical processing including, for example, taking the text information to the line buffer in an inverted form. Taking the text information to the line buffer may be performed in a regular manner and the information may be inverted by pure electrical processing in the course of supplying dot pattern information from the line buffer to the printing head.

Figure 2:
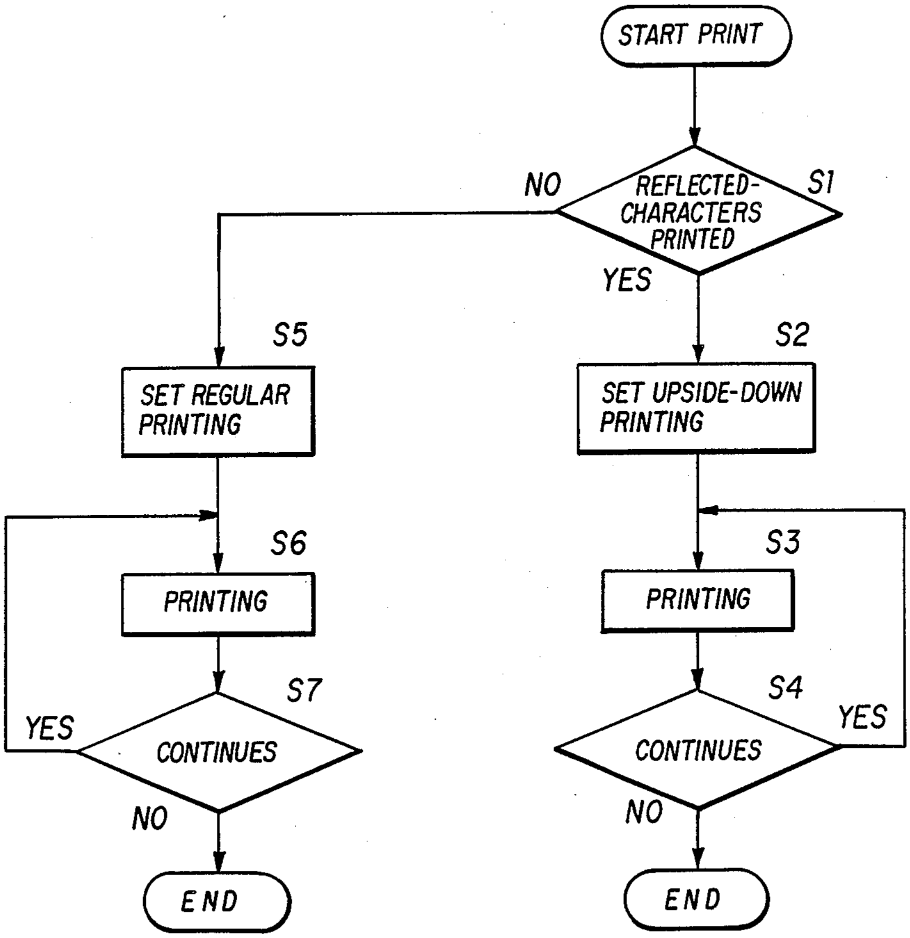
FIG. 2 is a flowchart for printing reflected characters by the printing apparatus according to this invention.

FIG. 2 is a flowchart showing the printing operation of reflected characters by the printing apparatus according to this invention. At the beginning of printing, at step S1 it is determined whether or not reflected characters are to be printed. For example, when the printing of reflected characters is selected in accordance with instructions from the keyboard 2, the determination is YES, so that upside-down printing is set as shown by step S2. At step S3 the set contents are printed. It is determined at step 4 whether the printing continues. If the determination is YES, the steps 3 and 4 are repeated. If the determination is NO at step S4, the printing ends.

When the determination is NO at step 1, regular printing is set at step S5, printing is performed at step S6, and it is determined at step S7 whether the printing continues. If the determination is YES, the steps S6 and S7 are repeated. If there is no need for continuing to print, printing ends.

Figure 3:
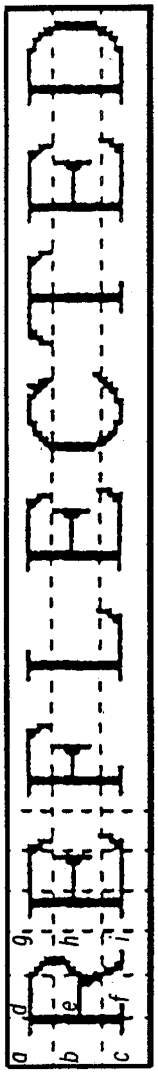
FIGS. 3 and 4 illustrate the character data status of regular and reflected characters.
Figure 4:
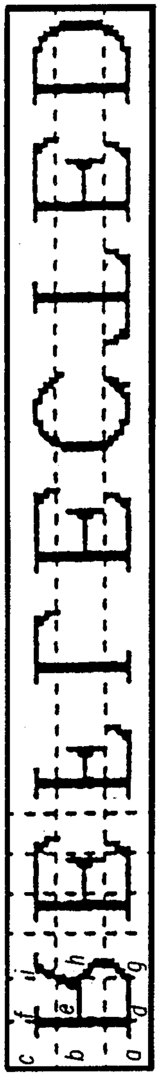

Setting the inverted printing corresponding to the step S2 will be described with reference to FIGS. 3 and 4. FIG. 3 shows an example of the reflected characters stored in the line buffer and FIG. 4 shows similar contents obtained when the reflected character printing is selected. Usually, an actual character is constituted by many dots. Herein, for purpose of explanation, one character is divided into $3\times3$ parts as shown by the broken lines and identified by a, b, c, d, e, f, g, h, i . . . Usually when regular characters are printed, dot pattern information is taken and printed in the sequence of parts a, b, c: d, e, f: g, h, i.

On the other hand, FIG. 4 shows the reflected characters obtained by selecting the reflected character printing, and inverting data upside down when the data are taken to the line buffer. The respective parts or sections defined by the broken lines are inverted upside down as is clear from comparison with the regular printing of FIG. 3. Therefore, character data is inverted, dot patter information is taken in the sequence c, b, a: f, e, d: i, h, g from the line buffer to the printing head in a regular manner, and the reflected character output inverted upside down is obtained. While in this embodiment a character is represented using $3\times3$ dots for simplifying the description, this concept, of course, may be applicable to regular $16\times16$-dot, $24\times24$-dot and $32\times32$-dot expressions.

Even when reflected characters are selected, a similar effect would be obtained, as described above, by selecting the sequence of dot patterns supplied from the line buffer to the printing head to be from the left bottom to the right top, namely, c, b, a: f, e, d: i, h, g without changing the sequence of taking data from the main memory to the line buffer in the state of FIG. 3.

Figure 5:
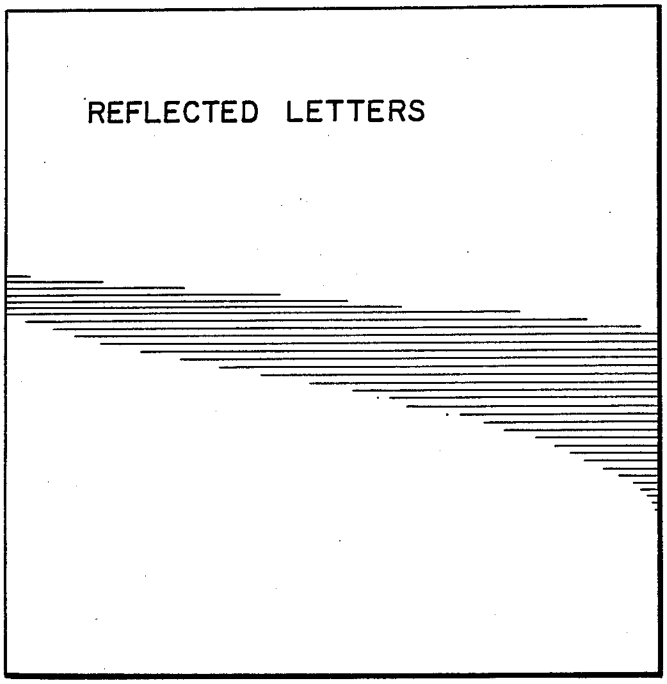
FIGS. 5 and 6 illustrate the printed outputs of regular and reflected characters.
Figure 6:
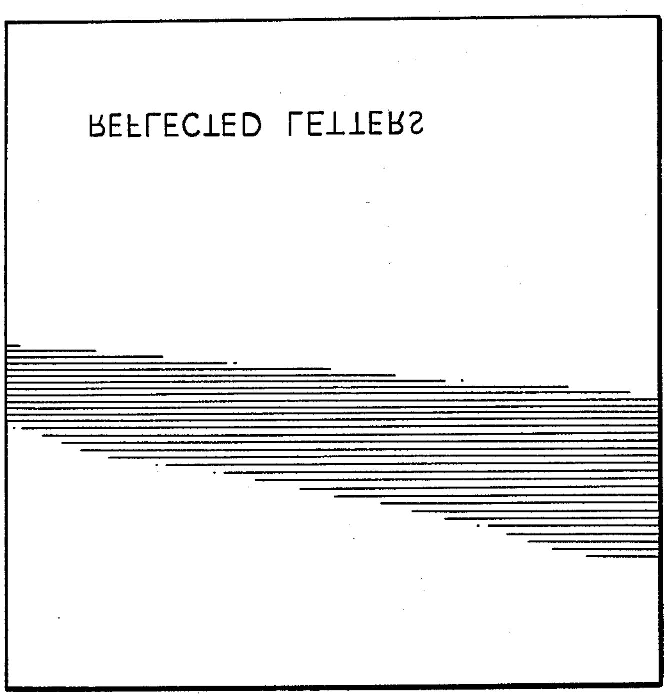

FIG. 5 shows a print obtained by regular printing. In contrast, FIG. 6 shows a print obtained from the line buffer output of FIG. 4. The train of reflected characters inverted upside down will become characters in normal or correct image and in normal or correct arrangement if they are viewed from their backs.

Figure 7:
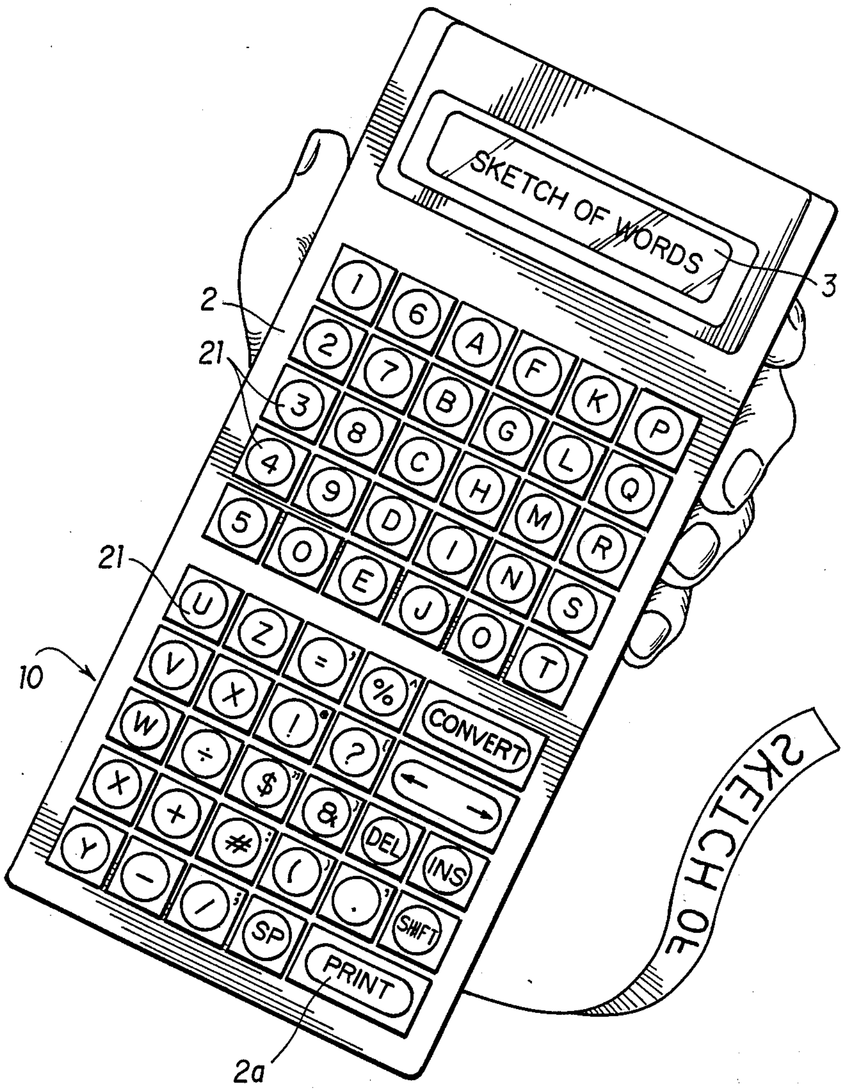
FIG. 7 is a perspective view of a printing apparatus according to this invention suitable for creating a lettering tape.
Figure 8:
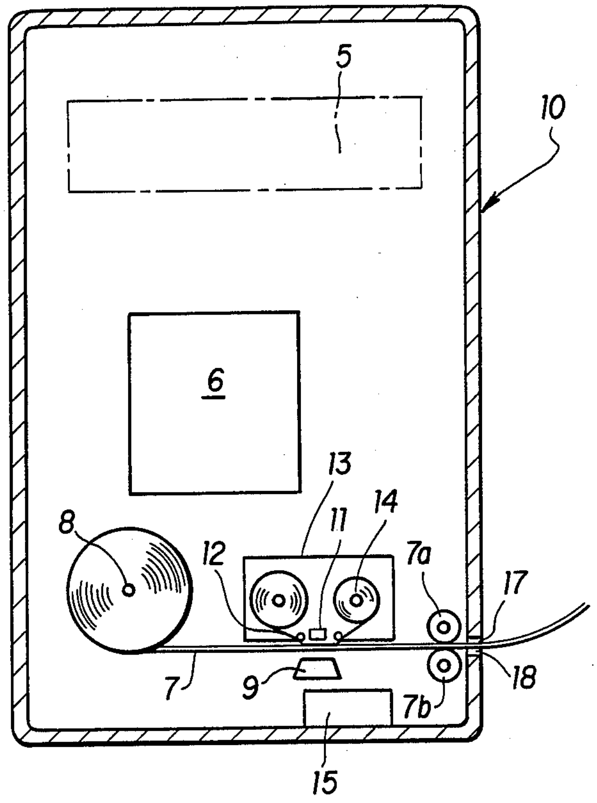
FIG. 8 is a cross-sectional view of the apparatus shown in FIG. 7.

FIG. 7 shows a printing apparatus according to this invention which especially creates a lettering tape. The apparatus has an appearance shown in FIG. 7 and is of a handy desk-top type small enough to be held by one hand. The casing 10 has a keyboard 2 with various character, symbol, etc., input keys arranged in row and column, and a display 5. The printing apparatus has an internal structure, shown in FIG. 8, which includes an IC substrate 6 which in turn comprises a predetermined electronic circuit within the casing 10. A lettering tape 7 in the form of a transparent film roll is mounted removably at its shaft 8. The tape 7 is guided between a pair of feed rollers 7*a* and 7*b* and taken from a discharge port 17 provided in one side of the casing 10. Halfway in the tape passageway, a platen 9 and a thermal transfer printing head 11 are provided in opposite relationship so that the tape can pass between the platen 9 and the transfer head 11. In addition, an ink ribbon cassette 13 is mounted removably so that the ink ribbon 12 can pass between the tape and the face of the printing head 11. A micromotor 15 is provided within the casing 10 so as to move the tape feed roller 7*b* and the reel shaft 14 for the ink ribbon 12.

The electronic circuit included in the IC substrate 6 is composed of the elements corresponding to the electrical control blocks shown in FIG. 1.

The lettering tape 7 may be a resin film of polyethylene, polypropylene, polyethylene terephthalate, nylon, polyimide, PTFE (Teflon), vinyl chloride or ABS; paper; or a metal foil. That surface of the tape which faces the transfer head 11 is preferably coated with a parting agent, for example, of silicon.

A cutter 18 is provided at the discharge port 17 to cut away that portion of the lettering tape 7 drawn out from the casing 10. When the tape 7 is drawn out by a predetermined length from the casing 10, the micromotor 15 is automatically stopped by a limit switch (not shown).

Figure 9A:
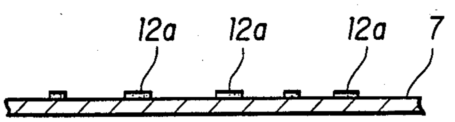
FIGS. 9A–9C illustrate the use of a lettering tape on which reflected characters are formed.
Figure 9B:
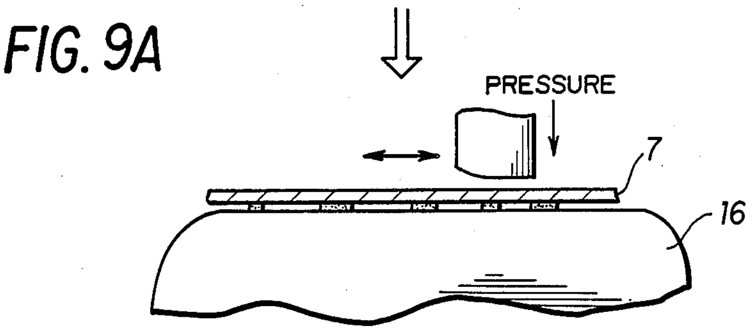
Figure 9C:
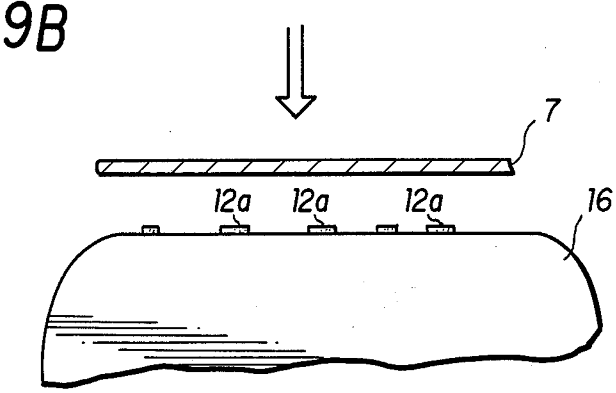

In the printing apparatus, when desired character, symbols, etc., are input by pressing the corresponding input keys 21, they are stored in the memory 4 under control of the CPU 1. At the same time, the characters, symbols, etc., are displayed at display 5. The user can create and edit a word, a phrase or a simple sentence while ascertaining the contents displayed on the display 5. Thereafter, if a printing key 2*a*, one of the input keys, is pressed, the micromotor 15 is driven to draw out the lettering tape 7 gradually and at the same time the characters, symbols, etc., stored in the memory 4 are transferred to the lettering tape 7 via the ink ribbon 12 by the printing head 11. In this case, during the time when the character data is supplied temporarily via the line buffer to the printing head 11, the dot pattern is inverted upside down to form reflected characters, symbols, etc., on the lettering tape 7, as shown in FIGS. 3 and 4. The lettering tape portion on which the reflected characters, symbols, etc., are thus transferred is cut away from the remaining lettering tape 7. If the ink transferred tape portion 7 is applied to an object 16 so that the ink transferred face 12 of the tape makes contact with the object, and is rubbed from the back thereof, as shown in FIGS. 9A–9C, the characters, symbols, etc., will be transferred in normal or correct image on the object 16.

Actually, the lettering tape creating apparatus according to this invention has various functions of switching various modes, shifting characters, symbols, etc., and designating the size of the characters, symbols, etc., when the characters, symbols, etc., are input, inserting and deleting characters, etc., in the edition of a document, and moving the cursor on the screen of the display 3, and several keys for fulfilling these functions, as shown in FIG. 7. These functions are substantially the same as those of general typewriters and wordprocessors.

The reflected-character printing apparatus according to this invention can input characters, symbols, etc., in a regular manner without paying any particular attention. Thereafter, if reflected character printing is selected, a train of desired reflected characters will be printed. This system achieves its object in a simple manner compared to the system in which reflected characters are prepared and registered in advance as external characters or the printing system which prints characters, symbols, etc., reversely, starting with the last character, symbol or the like.

What is claimed is:

1. A printing apparatus for creating a lettering tape comprising:

input means for inputting characters and symbols to said apparatus;

display means for displaying the inputted characters and symbols;

main memory means for storing information on the inputted characters and symbols;

one directional printing means including a print head and a printing ribbon for printing said inputted characters and symbols;

means for converting said characters and symbols in said main memory into dot pattern information;

means for inverting the dot pattern information upside down;

switching means for selecting between said inverted dot pattern information and for supplying said information to said printing means;

a lettering tape; and lettering tape feed means for feeding said lettering tape past said printing means.

2. The apparatus in accordance with claim 1 wherein said lettering tape includes a surface directed toward said print head, said surface being sufficiently hard to adhere with ink.

3. The apparatus in accordance with claim 1 wherein said lettering tape includes a surface directed toward said print head, said surface being coated with a parting agent.

* * * * *